March 22, 1955   K. FEDERN   2,704,452
OSCILLATORY MEASURING WITH STRAIN GAUGES
Filed Aug. 7, 1953   2 Sheets-Sheet 1

INVENTOR
Klaus Federn

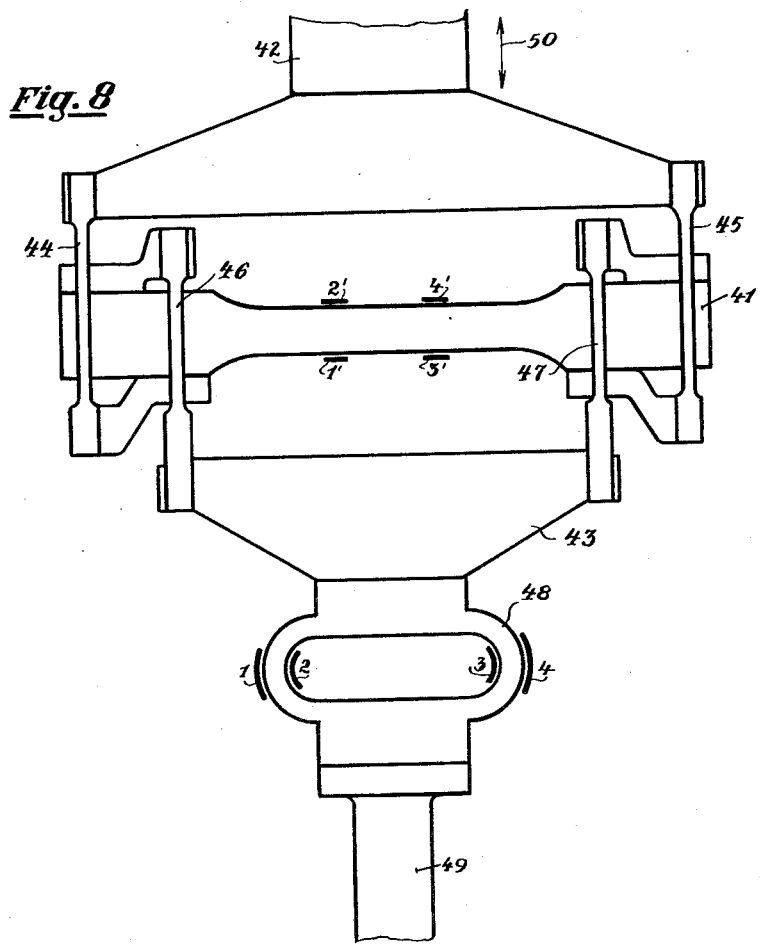
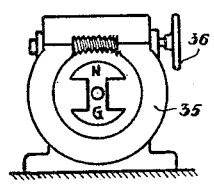
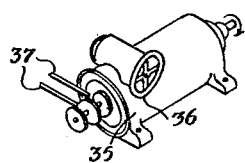

United States Patent Office 2,704,452
Patented Mar. 22, 1955

2,704,452

OSCILLATORY MEASURING WITH STRAIN GAUGES

Klaus Federn, Darmstadt, Germany, assignor to Carl Schenck Maschinenfabrik Darmstadt G. m. b. H., Darmstadt, Germany, a corporation of Germany Application August 7, 1953, Serial No. 373,020

10 Claims. (Cl. 73—88.5)

My invention relates to apparatus for measuring oscillatory quantities with the aid of strain gauges.

Such strain gauges consist essentially of an electric resistance wire which, when in use, is mounted on the body to be investigated and subjected to elongation depending upon the stresses imposed upon the body. The electric resistance of the wire varies accordingly and serves as a measure of the strain of the body. Static as well as dynamic strain quantities can thus be determined. Static measurements of constant loads can readily be made in a relatively simple manner by measuring the variable resistance of the strain gauge in a bridge circuit whose measuring diagonal contains an indicating instrument, for instance, a light-beam galvanometer of sufficient sensitivity ($10^{-7}$ amps).

Considerable difficulties, however, are encountered when using such a bridge circuit for oscillatory measurements of alternating elongations. Since alternating-current measuring instruments do not have a sufficient sensitivity when operating without an amplifier, a rather expensive amplifying apparatus must be used, usually in conjunction with carrier-frequency generating means of several thousand cycles per second, this carrier frequency being apt to cause trouble because of the capacitance of the circuit connections.

It is an object of my invention to devise an oscillatory measuring apparatus operating with strain gauges that affords reliable measurements of dynamic quantities with the aid of simpler measuring instruments and simpler measuring circuits than heretofore required.

To this end, and in accordance with a feature of my invention, I connect the strain gauges in a bridge circuit, energize the bridge circuit with alternating current of a frequency within the frequency range of the oscillatory quantities to be measured, and connect a direct-current measuring instrument in the measuring diagonal of the bridge circuit.

When thus energizing the bridge circuit of the strain gauges with alternating current of a frequency related to that of the dynamic elongations to be measured, the measuring diagonal of the bridge circuit is traversed by a direct current which is proportional to, and hence indicative of, the amplitude of dynamic elongation.

Such oscillatory measurements are favorably applicable not only to the testing of structures of various kinds and to machines for the testing of materials, but also for balance analyzing purposes such as the measurement and indication of unbalance in rotors.

Alternating dynamic stresses, as a rule, have a periodic and often a pure harmonic time characteristic. Under such conditions, the alternating current of the measuring bridge according to the invention is preferably given the same harmonic frequency as that of the dynamic stresses to be measured. If the dynamic stress is periodic but not harmonic, the alternating current is sequentially given those frequencies that are contained in the spectrum of the dynamic stress characteristic. The measuring instrument then shows an indication when the frequencies are coincident, and the indication is a maximum when the alternating current and the harmonic wave of the dynamic stress are in phase with each other.

These and other objects and features of my invention will be apparent from, and will be referred to in, the following description of the embodiments of my invention exemplified by the drawing in which:

Fig. 6 is a perspective view and Fig. 7 a schematic front view of a modified alternating-current generator applicable instead of the one shown in Fig. 5; and Fig. 8 shows a spring dynamometer structure with attached strain gauges applicable in a bridge circuit according to Fig. 1.

Figure 1:
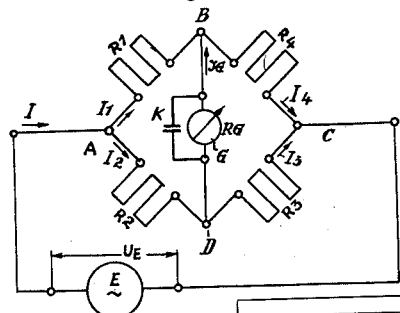
Fig. 1 is a strain-gauge bridge circuit.

In the circuit diagram of Fig. 1, the four branches of a bridge are formed by respective strain gauges 1 to 4 whose resistances are denoted by $R_1$ to $R_4$. The gauges are traversed by respective currents $I_1$ to $I_4$ when the bridge circuit is energized across its diagonal points A, C from a source E of an alternating voltage $U_E$. Connected in the measuring diagonal B—D of the bridge is a highly sensitive direct-current instrument G, for instance a mirror galvanometer, to which a capacitor K is shunt connected for the passage of alternating-current. The strip-shaped resistance gauges 1 to 4 may be cemented flat onto the surfaces of a structure to be subjected to alternating bending stresses. For instance, gauges 1 and 2 may be mounted on one side (front) and gauges 3 and 4 on the other side (rear) of a rod or strip 14 (see Figs. 2 to 4) which is subjected to periodic bending in S-shape. Then the dynamic elongation $\epsilon$ of the two sides follows the equations:

$$\epsilon = +\epsilon_0 \cdot \sin \omega t \text{ (front, on top and rear below)}$$
$$\epsilon = -\epsilon_0 \cdot \sin \omega t \text{ (rear, on top and front below)}$$

in which $\omega$ is the angular velocity ($=2\pi$ times the frequency), and $t$ denotes time.

When the voltage $U_E$ of source E has the same frequency so that $U_E = U_0 \sin \omega t$, and $R_G$ is the resistance of the direct-current instrument G, while the gauge resistances $R_1$ to $R_4$ are all equal to $R_C$ in the unloaded condition of the gauges, then the current $I_G$ flowing through the measuring diagonal can be determined from the following resistance equations:

Resistance equations $$R_1 = R_C(1 + r \cdot \epsilon_0 \cdot \sin \omega t)$$
$$R_2 = R_C(1 - r \cdot \epsilon_0 \cdot \sin \omega t)$$
$$R_3 = R_C(1 + r \cdot \epsilon_0 \cdot \sin \omega t)$$
$$R_4 = R_C(1 - r \cdot \epsilon_0 \cdot \sin \omega t)$$

Circuit balance equations $$+I_1 - I_4 + I_G = 0$$
$$+I_2 - I_3 - I_G = 0$$
$$+I_1 R_1 + I_4 R_4 = U_E$$
$$+I_2 R_2 + I_3 R_3 = U_E$$
$$+I_1 R_1 + I_3 R_3 - I_G R_G = U_E$$

In these equations, the factor $r$ denotes the sensitivity of the strain gauges, that is, the ratio of change in resistance to change in elongation. The sensitivity factor of the known and commercially obtainable strain gauges lies between $r=1.7$ and $r=3.6$. The value $\epsilon_0$ may amount up to $\frac{1}{1000}$, and $U_0$ may be made so large that a current of up to 20 milliamps will flow through each strain gauge.

It follows from these equations, disregarding negligibly small magnitudes, that the current $I_G$ in the measuring diagonal is in good approximation expressed as:

$$I'_G \approx \frac{-U_0 \cdot r \cdot \epsilon_0}{R_C + R_G} \cdot (\tfrac{1}{2} - \tfrac{1}{2} \cos 2\omega t)$$

This current has the direct-current component $$I_G \approx -U_0 \frac{r \cdot \epsilon_0}{2(R_C + R_G)}$$

Consequently, the galvanometer G is traversed by a direct current $I_G$ which is proportioned to the amplitude of dynamic elongation and hence is a measure of the quantity to be determined.

In order to energize the bridge circuit by current whose frequency is equal or integrally related to the frequency of the mechanical oscillations to be investigated, the voltage source of the bridge circuit, according to another feature of the invention, is made frequently-dependent upon the same cause that produces or controls the periodic mechanical loads. In testing machines, therefore, the alternating current is supplied from a generator or other source that is controlled from the same periodic machine drive which imparts to the specimen the power or load causing the periodic elongation of the strain gauges. Thus applied, the invention affords the advantage of force-responsive rather than travel-responsive measurements, being in this respect comparable to piezoelectric oscillation measuring devices while avoiding the disadvantages and electrical intricacies inherent in the latter type devices. Particularly, the invention does away with the need for sensitive amplication or, in many cases, affords reliable results without any amplifier.

The strain gauges may be mounted on the structure or specimen under investigation. In testing machines however, they are preferably mounted on a machine part that is subjected to dynamic load or deformation indicative of that to which the specimen is subjected. For instance, the strain gauges may be attached to a spring dynamometer, extensometer spring or other mechanical force gauge of an oscillatory testing machine. In a balance analyzing machine, operating at frequencies above the critical frequency of the specimen, the gauges are preferably attached to the supporting springs for the oscillatorily mounted bearings of the rotor to be tested, as will be described presently with reference to Figs. 2 to 5.

Figure 2:
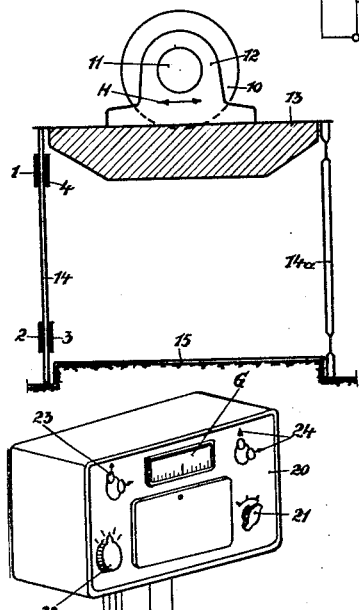
Fig. 2 is a schematic and part-sectional view of a balancing machine equipped with oscillation-responsive strain gauges to form part of a bridge circuit according to Fig. 1.

According to Fig. 2, the shaft 11 of a rotor to be tested for unbalance is journalled in a bearing 12 mounted on a rigid traverse 13 which is supported by two spring struts 14, 14a on a rigid machine foundation 15. Due to the resiliency of the spring struts 14, 14a, the traverse 13 is capable of horizontal oscillations as is indicated by a double-headed arrow H.

Figure 3:
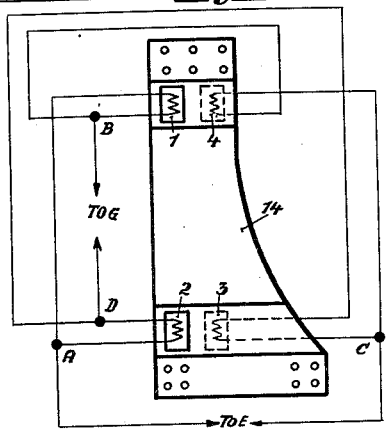
Figs. 3 and 4 show, respectively, a side view and a front view of one of the strain-gauge carrying structures of the machine according to Fig. 2.
Figure 4:
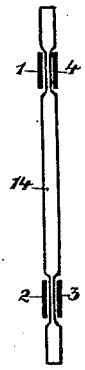

Four strain gauges, 1 to 4, are cemented to the spring struts 14, and when in operation, are connected in a bridge circuit according to Fig. 1 as is apparent from the schematic circuit diagram illustrated in Fig. 3.

When the rotor 10 is being driven, any unbalance will cause the traverse 13 to perform horizontal oscillations which are transmitted to the spring struts 14, 14a and cause the four strain gauges, 1 to 4, to vary their respective resistance values. The direct current instrument G then indicates the amplitude of the periodic deformations as explained above with reference to Fig. 1. The alternating current is supplied to the measuring bridge from an alternating-current transmitter coupled with the rotor 10, so that the frequency of the alternating current is identical with the frequency of revolution of rotor 10 and hence also with the frequency of the unbalance oscillations to be measured. The galvanometer G indicates a current proportional to the unbalance component that is in phase with the alternating current. Consequently, when the phase position of the alternating current is made adjustable relative to the angular position of the rotor, the device permits indicating the unbalance component in any desired reference direction. It is thus possible to determine the unbalance vector as to magnitude and angular position, or to determine it by measuring its components in two coordinate directions, for instance, in the vertical and horizontal directions.

Figure 5:
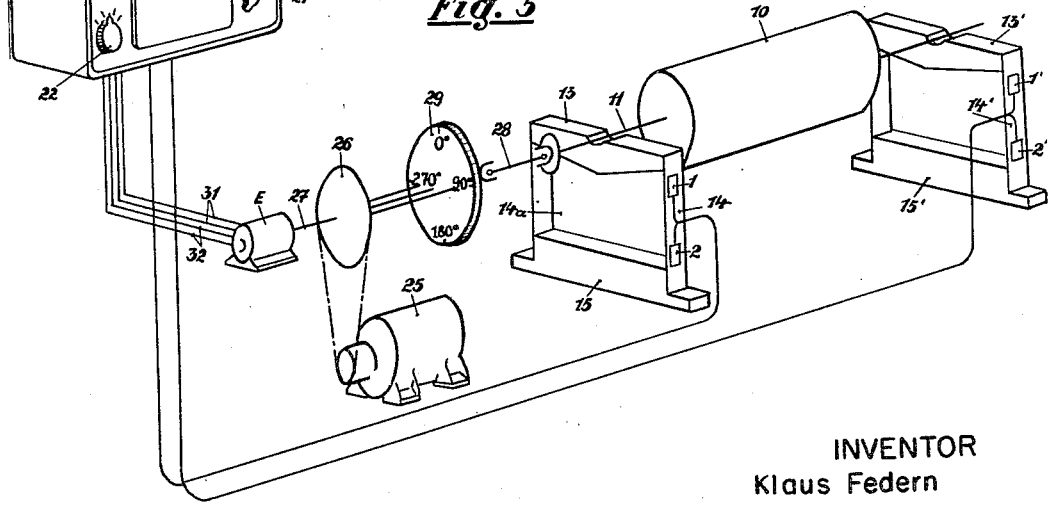
Fig. 5 is a perspective and schematic showing of another balancing machine similar to that of Fig. 2, but comprising a synchronous generator of alternating reference voltages.

This will be more fully understood from the schematic illustration of the machine presented in Fig. 5.

For simplicity, only the strain gauges 1 and 2 of spring strut 14 are shown in Fig. 5. These guages are connected to a measuring bridge contained within the housing 20 of a unit that also includes the galvanometer G and may be equipped with the customary rheostats for adjusting the sensitivity of the indication by means of a manually controllable sensitivity selector 21. The device also contains a four-position switch 22 and two sets of indicator lamps 23, 24 whose purpose will be explained in a later place.

The rotor 10, journalled on two traverses 13 and 13′, is driven from a motor 25 through a belt sheave 26, a counter shaft 27, and a cardanic shaft 28. A disc 29 with an angular division 0° to 360° is mounted on shaft 27. A phase-reference transmitter consisting of a dynamo-electric sine-wave generator E is coupled with shaft 27. Hence, disc 29 and transmitter E revolve in synchronism with the rotor 10 and in a given angular relation thereto. The transmitter E has two pairs of output leads 31 and 32 which supply two alternating currents 90° phase displaced from each other.

The above mentioned four-position switch 22, when placed in one of its positions, connects only the pair of leads 31 to the measuring network and at the same time connects the galvanometer to the gauges in such a manner that the galvanometer indication is indicative of the unbalance-responsive behavor of the strain gauges on spring strut 14, located on the left-hand side of rotor 10. As explained, the deflection of the galvanometer G indicates only the unbalance component that is in phase with the alternating current of leads 31. When this current is properly phased, the deflection of the galvanometer indicates the horizontal unbalance component at the left side of the rotor. A corresponding one of the lamps 23 is so connected with switch 22 that this lamp is to indicate to the operator that the horizontal unbalance at the left side is being measured.

In the next position of switch 22, the other pair of leads 32 is connected with the measuring network and the other lamp 23 is lit. The galvanometer then indicates the vertical unbalance at the left rotor side.

In the third position of switch 22, the leads 31 are connected with the bridge and the horizontal indicator lamp 24 is in operation. Now, however, the bridge network is connected for having the galvanometer indication respond to the unbalance effective upon the gauges (1′, 2′) on strut 14′ of the right-hand traverse 13′. Hence, the horizontal unbalance at the right-hand side of the rotor is now indicated.

In the fourth position of switch 22, the leads 32 are connected to the bridge network and the vertical indicator lamp 24 is lit. The galvanometer now indicates the vertical unbalance at the right-hand side of rotor 10.

The just described balance-analyzing system may be equipped with auxiliary devices and accessories as customary with balancing machines. Particularly, the bridge circuits, essentially corresponding to Fig. 1, may be equipped with compensating potentiometer circuits as customary for eliminating the effect of unbalance at one side of the rotor relative to the indication of unbalance at the other side. Since such auxiliary means are generally known and in use, and are not essential to the invention proper, they are not illustrated on the drawing.

While in the above described example the unbalance of the rotor is analyzed into two coordinate components, it is also possible to determine the unbalance by its magnitude and angular position. To this end, an alternating-current transmitter may be used which supplies only one current, but whose phase position is adjustable. An example of such a phase transmitter is illustrated in Figs. 6 and 7. The transmitter consists of a dynamo-electric generator 35 whose stator can be rotated by means of a hand wheel 36. The output leads 37 of the generator are connected to the energizing terminals (points A and C in Fig. 1) of the measuring bridge. When during the measuring operation the rotary position of the stator is progressively changed, a position will be reached at which the galvanometer indication is a maximum. This maximum is indicative of the magnitude of the unbalance, while the angular position of the generator represents the angular position of the unbalance relative to the rotor being tested.

If the invention is to be applied for the purpose of calibration, or for measuring tension or elongation in pulsers (oscillatory testing machines operating by alternately compressing or tensioning a specimen in its axial direction), in machines for bending tests, or in torsional or similar testing machines, then it is usually sufficient to use a bridge circuit of the type shown in Fig. 1 in conjunction with an alternating-current generator with a rotatable stator as exemplified by the generator described in the foregoing with reference to Figs. 6 and 7.

A phase transmitter of adjustable phase position, such as the described generator with a rotatable stator, also permits using the invention for measuring the damping characteristics of structural parts. To this end, a calibrated dynamometer or other force gauge is series connected with the structural part in a dynamic testing machine so that the dynamometer or force gauge is subjected to the same load as the structural part. The strain gauges attached to the dynamometer or force gauge then afford measuring the force or moment, that is, generally the load, to which the structural part and the gauge assembly are simultaneously subjected. An embodiment of this kind is illustrated in Fig. 8.

According to Fig. 8, a structural part or specimen 41 is firmly secured to the heads 42 and 43 of a testing machine by means of elastically bendable struts 44, 45 and 46, 47. The specimen 41 carries the strain gauges 1', 2', 3', and 4'. Head 43 is secured to a force gauge or dynamometer spring 48 whose elastic portions carry the strain gauges 1, 2, 3, and 4. These gauges or the gauges 1', 2', 3', and 4' are alternatively connected in a bridge circuit according to Fig. 1. The other side of the dynamometer gauge 48 is firmly secured to a bolt 49 mounted in a rigid abutment structure (not illustrated). The head 42 is subjected to oscillatory loads in the axial direction of the specimen as is indicated by a double-headed arrow 50. The pulsing stresses acting upon the specimen 41 are also effective to periodically deform the force gauge 48, and these deformations are measured by means of the above described bridge circuit. The machine drive (not illustrated in Fig. 8) that produces the pulsing stresses drives also a generator according to Figs. 6 and 7 which energizes the bridge circuit. When operating the machine, the angular positions of the generator are determined at which the indication of the galvanometer is a maximum or passes through zero, while strain gauges 1', 2', 3', and 4' are connected to the galvanometer in a bridge circuit according to Fig. 1. These two positions represent two respective values which depend upon the deformation of the specimen. After determining these two positions, the galvanometer is connected to the strain gauges 1, 2, 3, 4, and two readings are taken the ratio of which is equal to the tangent of the angle of damping, that is, to the phase angle between the pulsating load and the resulting deformation. This requires the load and the deformation to be sufficiently accurately in accordance with a harmonic characteristic. The angle of damping may also be directly read off the stator of the alternating-current transmitter if the transmitter, subsequent to measuring the specimen elongation, is turned to the point where the galvanometer shows either the zero passage or the maximum of pulsating load.

It will be apparent to those skilled in the art, upon a study of this disclosure, that my invention permits of various modifications and may be embodied or applied in a manner other than specifically illustrated and described, without departing from the essential features of my invention and within the scope of the claims annexed hereto.

I claim:

1. Oscillatory measuring apparatus, comprising strain gauges to be joined with structure under observation and having electric resistance variable in response to oscillatory loads imposed upon the structure, a bridge circuit having bridge branches including said respective strain gauges and having a measuring diagonal and an energizing diagonal, a direct-current measuring instrument connected in said measuring diagonal, and alternating-current supply means connected in said energizing diagonal and having a frequency within the frequency range of said oscillatory loads.

2. Oscillatory measuring apparatus according to claim 1, comprising four of said strain gauges, said strain gauges being mounted in two pairs on opposite sides respectively of said structure when in operative condition so that the two gauges of one pair are subjected to elongation while the two gauges of the other pair are simultaneously subjected to contraction, said gauges of said one pair being connected in two opposite branches of said bridge circuit respectively, and said gauges of said other pair being connected in the remaining two branches respectively.

3. In oscillatory measuring apparatus according to claim 2, said four strain gauges having the same resistance when unstressed.

4. Oscillatory measuring apparatus, comprising strain gauges to be joined with structure under observation and having electric resistance variable in response to oscillatory loads imposed upon the structure, a bridge circuit having bridge branches including said respective strain gauges and having a measuring diagonal and an energizing diagonal, a direct-current measuring instrument connected in said measuring diagonal, a source of alternating current connected in said energizing diagonal, and drive means adapted for connection to the structure to produce said oscillatory loads, said drive means being connected with said source for controlling the latter so that the alternating current has a frequency substantially equal to that of said oscillatory loads.

5. Apparatus for measuring oscillatory loads composed of a spectrum of harmonics of respectively different frequencies, comprising variable-resistance strain gauges to be joined with structure to be subjected to said oscillatory loads, a bridge circuit having bridge branches including said respective strain gauges and having a measuring diagonal and an energizing diagonal, a direct-current instrument connected in said measuring diagonal, and an alternating-current source connected in said energizing diagonal and having a frequency substantially equal to a frequency of said spectrum, whereby said instrument indicates a given harmonic component of said load.

6. Apparatus for measuring oscillatory loads, comprising variable-resistance strain gauges to be joined with structure to be subjected to said oscillatory loads, a bridge circuit having bridge branches including said respective strain gauges and having a measuring diagonal and an energizing diagonal, a direct-current instrument connected in said measuring diagonal, an alternating-current source connected in said energizing diagonal and having a frequency within the frequency range of said oscillatory loads and comprising phase-shift means for varying the phase relation of the alternating current relative to said loads.

7. Apparatus for measuring oscillatory loads, comprising a testing-machine part elastically deformable in accordance with oscillatory loads of a specimen to be tested, variable-resistance strain gauges attached to said part, a bridge circuit having bridge branches including said respective strain gauges and having a measuring diagonal and an energizing diagonal, a direct-current measuring instrument connected in said measuring diagonal, and an alternating current source connected in said energizig diagonal and having a frequency within the frequency range of said oscillatory loads.

8. Apparatus for measuring unbalance of rotors, comprising bearing means for journalling a rotor to be tested, elastically deformable spring means on which said bearing means are mounted so as to be capable of oscillating due to unbalance of the rotor, drive means for connection to the rotor, variable-resistance strain gauges attached to said spring means, a bridge circuit having bridge branches including said respective strain gauges and having a measuring diagonal and an energizing diagonal, a direct-current measuring instrument connected in said measuring diagonal, and an alternating current source connected in said energizing diagonal, said drive means being connected with said source so that the frequency of said source corresponds to that of the rotor revolution.

9. Apparatus for measuring oscillatory loads, comprising an elastically deformable dynamometer structure, means for joining a specimen with said structure, pulsating drive means mechanically series connected with said structure and with said specimen when the apparatus is in operation to impose the same oscillatory load upon both, strain gauges joined with said structure, a bridge circuit having bridge branches including said respective strain gauges and having a measuring diagonal and an energizing diagonal, a direct-current measuring instrument connected in said measuring diagonal, and alternating-current generator means connected in said energizing diagonal, said drive means being connected with said generator means so that the frequency of the alternating current corresponds to that of said load.

10. In apparatus according to claim 9, said alternating-current generator means comprising phase shift means to permit measuring the phase angle between the respective deformations of the specimen and the dynamometer structure respectively.

References Cited in the file of this patent

UNITED STATES PATENTS

| | | |
|---|---|---|
| 1,880,425 | Flanders | Oct. 4, 1932 |
| 2,316,975 | Ruge | Apr. 20, 1943 |
| 2,394,411 | Tolman | Feb. 5, 1946 |
| 2,423,867 | Zener | July 15, 1947 |
| 2,636,381 | Hagg | Apr. 28, 1953 |
| 2,642,741 | Du Pont | June 23, 1953 |